United States Patent
Reed, III et al.

(10) Patent No.: US 9,836,970 B1
(45) Date of Patent: Dec. 5, 2017

(54) VEHICLE POSITIONING GUIDE LIGHTS

(71) Applicants: Clifford Reed, III, Woodland, PA (US);
Robert Lee Fye, Jr., Reynoldsville, PA (US)

(72) Inventors: Clifford Reed, III, Woodland, PA (US);
Robert Lee Fye, Jr., Reynoldsville, PA (US)

(73) Assignee: HydroSpray Wash Systems Inc., Clearfield, PA (US)

( * ) Notice: Subject to any disclaimer, the term of this patent is extended or adjusted under 35 U.S.C. 154(b) by 0 days.

(21) Appl. No.: 15/160,834

(22) Filed: May 20, 2016

(51) Int. Cl.
*G08G 1/017* (2006.01)
*G08G 1/095* (2006.01)
*B60S 3/04* (2006.01)
*G01S 15/06* (2006.01)
*G01S 13/06* (2006.01)
*G08G 1/16* (2006.01)

(52) U.S. Cl.
CPC ............... *G08G 1/095* (2013.01); *B60S 3/04* (2013.01); *G01S 13/06* (2013.01); *G01S 15/06* (2013.01); *G08G 1/168* (2013.01)

(58) Field of Classification Search
CPC .. B08B 3/00; B08B 3/04; B08B 1/095; B08B 1/168; B60S 3/04; G01S 13/06; G01S 15/06; G08G 1/095; G08G 1/017; G08G 3/00; B60R 2001/1215
USPC ...... 340/815.4, 928; 134/18, 113, 123, 56 R, 134/57 R
See application file for complete search history.

(56) References Cited

U.S. PATENT DOCUMENTS

| | | | | |
|---|---|---|---|---|
| 6,147,625 A | * | 11/2000 | Decker | ..................... B60S 3/04 134/123 |
| 7,438,075 B1 | * | 10/2008 | Huntington | ............... B60S 3/04 134/123 |
| 2007/0034235 A1 | * | 2/2007 | Weyandt | ................... B60S 3/04 134/18 |
| 2011/0197922 A1 | * | 8/2011 | Turner | ...................... B60S 3/04 134/18 |
| 2011/0197924 A1 | * | 8/2011 | Belanger | .................. B60S 3/04 134/18 |
| 2016/0116303 A1 | * | 4/2016 | Rose | ................... G06F 3/04817 702/188 |

FOREIGN PATENT DOCUMENTS

WO 2004/072932 * 8/2004 ............... G09F 9/33

* cited by examiner

*Primary Examiner* — Hung T Nguyen
(74) *Attorney, Agent, or Firm* — Dane C. Butzer

(57) ABSTRACT

A system that assists a driver with properly positioning a vehicle. Such systems may include an interface to information from vehicle sensor(s), light strip(s), and computing device(s) including one or more tangible computing elements. The computing device(s) may perform steps that include determining a position of the vehicle using the information from the vehicle sensor(s), and generating optical indication(s) using the light strip(s) of an action that the driver should take based on the position. In some aspects, the system is deployed in a carwash bay and assists the driver with properly positioning the vehicle in the carwash bay. The optical indication may be green light to indicate that the vehicle should be moved forward, blue light to indicate that the vehicle should be moved backward, and red light to indicate that the vehicle should be stopped. Also, associated methods.

18 Claims, 3 Drawing Sheets

VEHICLE POSITIONING GUIDE LIGHTS

CROSS-REFERENCE TO RELATED APPLICATION

Not applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

The present disclosure generally relates to guide lights intended to assist drivers with properly positioning their vehicles in certain environments, for example carwash bays.

SUMMARY

Aspects of the subject technology include systems that assist a driver with properly positioning a vehicle. Such systems may include an interface to information from vehicle sensor(s), light strip(s), and computing device(s) including one or more tangible computing elements. The computing device(s) may perform steps that include determining a position of the vehicle using the information from the vehicle sensor(s), and generating optical indication(s) using the light strip(s) of an action that the driver should take based on the position. In some aspects, the system is deployed in a carwash bay and assists the driver with properly positioning the vehicle in the carwash bay.

In some aspects, the system is deployed in a carwash bay and assists the driver with properly positioning the vehicle in the carwash bay. The strip(s) may be proximate to a floor of the carwash bay. For example, the light strip(s) may be disposed in a groove of a material placed on the floor of the carwash bay. For another example, the light strip(s) may be disposed in a groove in the floor of the carwash bay.

The vehicle sensor(s) may be sonar sensor(s), optical sensor(s), radar sensor(s), or some combination thereof. The light strip(s) may be an LED or flex Neon light strip.

In some aspects, the optical indication may be green light to indicate that the vehicle should be moved forward, blue light to indicate that the vehicle should be moved backward, and red light to indicate that the vehicle should be stopped. Furthermore, the optical indication may include apparent movement of the green light forward, apparent movement of the blue light backward, and/or no movement of the red light.

The system may also indicate a malfunction, for example a detected breakdown of equipment in a carwash bay. The indication may be using the light strip(s) to generate a blinking red light.

Other signaling device(s) may also be included. For example, an optical display may be included. For another example, an audio signaling device may be included to provide computer-generated verbal instructions, warning sounds, or the like.

The subject technology also includes methods performed by and/or associated with the foregoing systems.

This brief summary has been provided so that the nature of the invention may be understood quickly. Additional steps and/or different steps than those set forth in this summary may be used. A more complete understanding of the invention may be obtained by reference to the following description in connection with the attached drawings.

DETAILED DESCRIPTION

Briefly, aspects of the subject technology include systems that assist a driver with properly positioning a vehicle. Such systems may include an interface to information from vehicle sensor(s), light strip(s), and computing device(s) including one or more tangible computing elements. The computing device(s) may perform steps that include determining a position of the vehicle using the information from the vehicle sensor(s), and generating optical indication(s) using the light strip(s) of an action that the driver should take based on the position. In some aspects, the system is deployed in a carwash bay and assists the driver with properly positioning the vehicle in the carwash bay.

Figure 1:
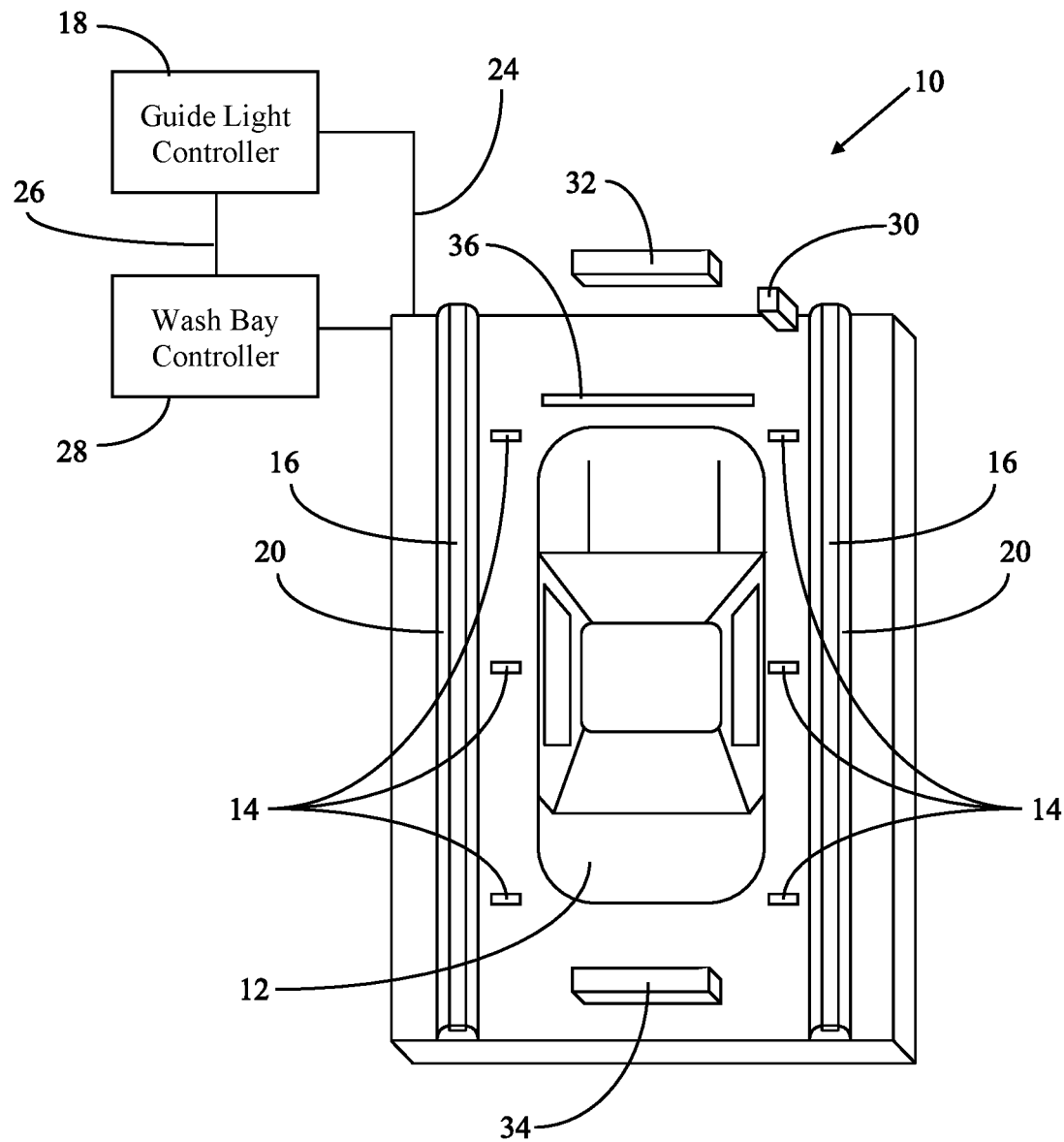
FIG. 1 illustrates a system that assists a driver with properly positioning a vehicle according to aspects of the subject technology.

In more detail, FIG. 1 illustrates system 10 that assists a driver with properly positioning vehicle 12 in a carwash bay according to aspects of the subject technology. The system illustrated in FIG. 1 includes vehicle sensors 14, light strips 16, and guide light controller 18.

Vehicle sensors 14 may be any type of sensors. Examples include but are not limited to sonar sensor(s), optical sensor(s), radar sensor(s), and other types of sensor(s). Any suitable combination and/or number of sensor(s) may be used.

Light strips 16 are shown disposed in grooves on top of rails 20. Light from the strips in the grooves may be readily seen by a driver of vehicle 12. The rails may also provide physical feedback to a driver if he or she drive the vehicle too far to a side of the carwash bay.

The rails may have a semicircular cross-section, for example produced by slitting a tube or pipe in half lengthwise. Alternatively, the rails may be extruded or otherwise formed in that shape. The rails preferably are made of a suitably strong but somewhat flexible material such as high-density polyethylene (HDPE), HDPVE, or the like. Use of such materials may help protect the light strips and/or the rails while reducing potential for damage to a vehicle's tires and/or wheels if the vehicle runs over the rails. The rails preferably are white. Other shapes, materials, and colors may be used.

In some aspects, the rails are formed in sections that may be linked together in order to accommodate different sized environments. For example, the rails may be made of 8-foot-long sections. In these aspects, suitable mechanical and electrical connectors may be incorporated into the sections and/or used to join the sections. The rails and/or sections may be secured to the floor of the carwash bay using any suitable mechanism(s) including but not limited to screw(s), bolt(s), other physical fastener(s), adhesive, other mechanism(s), and/or some combination thereof.

Guide light controller 18 may be, include, and/or interact with one or more computing devices that include at least one tangible computing element in order to control aspects of system 10. The guide light controller preferably includes an interface to information from vehicle sensors 14. This information may be provided directly to the guide light controller via interface 24 to the vehicle sensors. Alternatively, the information may be provided via interface 26 through one or more other computing devices such as carwash bay controller 28.

The guide light controller may also include interfaces for other signals to and/or from carwash bay controller 28. The signals may include status of the carwash bay, commands for the carwash bay controller to take certain actions such as activating other signaling devices in the carwash bay, and the like. Interfaces to signals from one or more other devices may be included as well.

In operation, guide light controller 18, either alone or in combination with carwash bay controller 28 and/or other computing devices, may perform steps that include determining a position of vehicle 12 using the information from vehicle sensors 14, and generating at least one optical indication using light strips 16 of an action that the driver should take based on the position of the vehicle.

Optical indication generated using the light strip may be green light to indicate that the vehicle should be moved forward, blue light to indicate that the vehicle should be moved backward (i.e., in reverse), and red light to indicate that the vehicle should be stopped. A driver seeing green light, either directly or indirectly, likely will know that the light indicates "move forward." Likewise, a driver seeing red light likely will know that the light indicates "stop." A driver seeing blue light may know or learn that the light indicates "move backward."

In an attempt to enhance understanding of what the light indicates, the optical indication may include apparent movement of the green light forward, apparent movement of the blue light backward, and/or no movement of the red light. For example, green or blue light generated by light strips 16 may be generated in sections with space between the sections. The lit sections may then be moved progressively in a particular direction. In preferred aspects, apparent movement of green light may be forward and apparent movement of blue light may be backwards. Red light preferably is generated without any space between sections (i.e., the entire light strips are lit) and/or with no apparent movement.

Other colors of light may be used, especially to indicate that the vehicle should be moved backward. In addition, various visual effects such as flashing or blinking may be incorporated. These effects may be used to attract a driver's attention, for example if the vehicle is not moved or stopped a certain period of time (e.g., 5 seconds) after a corresponding indication has been provided to the driver. The effects may be used for other purposes as well.

The system may also indicate a malfunction, for example a detected breakdown of equipment in the carwash bay. The breakdown may be detected via signals from carwash bay controller 28 and/or in some other manner. The indication may be generation of a blinking red light. Advantageously, an owner of the carwash bay may easily see this indication when driving by the bay. The indication of a breakdown may also be transmitted by the system in the form of a text message, automated phone call, email, and/or any other signaling mechanism.

Additional signaling device(s) may also be included. Examples shown in FIG. 1 are displays 30, 32, and 34. One or more audio signaling device(s) may be included to provide computer-generated verbal instructions, warning sounds, or the like. Guide light controller 18, wash bay controller 28, some other computing device(s), or some combination thereof may cause one or more of the other signaling devices to generate messages such as directions to a driver (e.g., "Go," "Move Forward," "Stop," "Backup," "Reverse," "Exit," or the like), a status of the carwash bay (e.g., "Open," "Closed," or the like), and/or other messages. In addition, the light strips and/or other signaling devices (s) may be used for advertising purposes, to attract drivers to the carwash bay (e.g., by flashing interesting or eye-catching light patterns), and/or for other purposes. Preferably, the indications and/or messages generated by the light strips and/or other signaling devices are coordinated by the computing devices.

In some aspects, line 36 may be included to assist a driver with understanding where the vehicle should be positioned. In some aspect, line 36 may also be a light strip that preferably generates a same color light as light strip(s) 16. In other aspects, line 36 may be a painted line or a line made of reflective material. Other indicator(s), signaling device(s), marker(s), and/or the like may also be provided.

Figure 2:
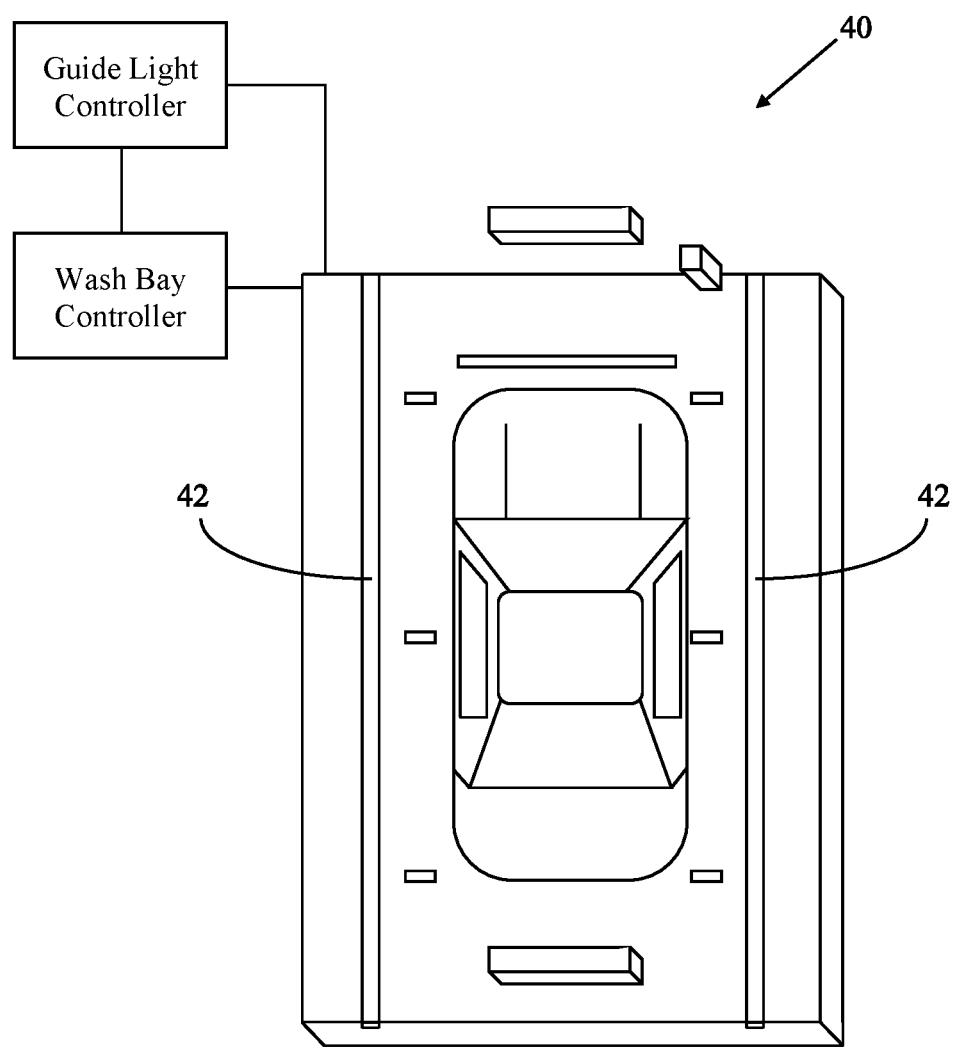
FIG. 2 illustrates a possible variation of the system shown in FIG. 1.

FIG. 2 illustrates a possible variation of the system shown in FIG. 1. System 40 in FIG. 2 includes similar elements as those discussed above with respect to FIG. 1. However, light strips 42 are disposed in grooves in a floor of the carwash bay rather than in rails. One or more light strips may also be disposed in other locations in addition to or instead of where illustrated. For example, one or more lights strips may be disposed in rails or grooves on one or more walls and/or a ceiling of a carwash bay. Any number of light strips may be used. Additional features such as transparent protective coatings and/or coverings for the light strips may also be included.

Figure 3:
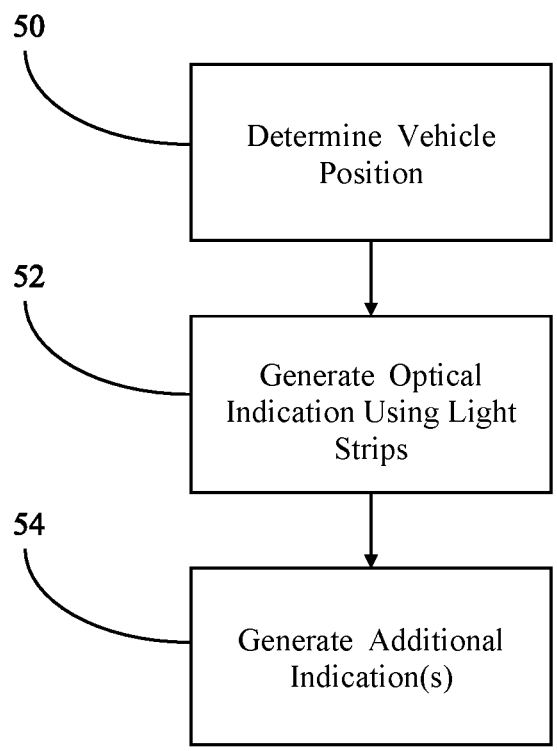
FIG. 3 shows a flowchart illustrating a method of assisting a driver with properly positioning a vehicle according to aspects of the subject technology.

FIG. 3 shows a flowchart illustrating a method of assisting a driver with properly positioning a vehicle according to aspects of the subject technology. The method preferably is performed by one or more computing device(s) including at one or more tangible computing elements. In step 50, the computing device(s) determine a position of the vehicle using information from at least one vehicle sensor. In step 52, at least one optical indication using at least one light strip is generated under control of the computing device(s). The optical indication informs a driver of an action that should be taken based on the position of the vehicle. In optional step 54, additional optical and/or audio indications are generated. Further details of the method, possible variations, and/or systems that may be used to implement the method are discussed above with respect to FIGS. 1 and 2.

Additional potential features, benefits, options, and/or aspects of the subject technology are set forth below. The subject technology is not limited to these additional potential features, benefits, options, and/or aspects.

Features

Custom length linear foot to meet various bay lengths and/or environments

Reinforced structure to protect light strip(s) from tire traffic

Low voltage safe for wet environments

Plastic guides may be attached directly to or in floor(s), wall(s), and/or a ceiling Benefits Alternative to painted yellow lines or reflective markers Faster wash loading Increase through put Reduce customer error Help prevent accidents from occurring Easy to understand Drive impulsive purchases Quickly capture the attention of a driver Aspect of the subject technology are illustrated and discussed in this document in the context of a carwash bay. (Note: car washing elements such as sprays, brushes, blowers, etc. are not shown so as to avoid overcomplicating the figure.) The subject technology may also be applied in any other contexts where proper positioning of a vehicle is desired, for example but not limited to truck wash bays, aircraft hangers, airport gates, factories, amusement parts, parking garages, hospitals, prisons, and the like.

The computing device(s) discussed above preferably include at least one tangible computing element. Examples of a tangible computing element include but are not limited to a microprocessor, application specific integrated circuit, programmable gate array, memristor based device, and the like. A tangible computing element may operate in one or more of a digital, analog, electric, photonic, and/or some other manner. Examples of a computing device include but are not limited to a mobile computing device such as a smart phone or tablet computer, a laptop computer, a desktop computer, a server, a client that communicates with a server, a part of a cloud computing system, a virtualized computing device that ultimately runs on tangible computing elements, or any other form of computing device. The computing device preferably includes or accesses storage for instructions and data used to perform steps such as those discussed above.

Additionally, some operations may be considered to be performed by multiple computing devices. For example, steps of displaying may be considered to be performed by both a local computing device and a remote computing device that instructs the local computing device to display something. For another example, steps of acquiring or receiving may be considered to be performed by a local computing device, a remote computing device, or both. Communication between computing devices may be through one or more other computing devices and/or networks.

The invention is in no way limited to the specifics of any particular embodiments and examples disclosed herein. For example, the terms "aspect," "example," "may," "preferably," "alternatively," and the like denote features that may be preferable but not essential to include in some embodiments of the invention. In addition, details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Some steps may be performed serially, in parallel, in a pipelined manner, or in different orders than disclosed herein. Many other variations are possible which remain within the content, scope, and spirit of the invention, and these variations would become clear to those skilled in the art after perusal of this application.

What is claimed is:

1. A system that assists a driver with properly positioning a vehicle, comprising:
    an interface to information from at least one vehicle sensor;
    at least one light strip disposed on or in a floor of a carwash bay; and
    at least one computing device including one or more tangible computing elements that perform steps comprising:
        determining a position of the vehicle using the information from the at least one vehicle sensor; and
        generating at least one optical indication using the at least one light strip of an action that the driver should take based on the position of the vehicle;
    wherein the at least one light strip is disposed in a groove of a material placed on the floor of the carwash bay; or
    wherein the at least one light strip is disposed in a groove in the floor of the carwash bay.

2. The system as in claim 1, wherein the system assists the driver with properly positioning the vehicle in the carwash bay.

3. The system as in claim 1, wherein the at least one light strip is disposed in the groove of the material placed on the floor of the carwash bay.

4. The system as in claim 1, wherein the at least one light strip is disposed in the groove in the floor of the carwash bay.

5. The system as in claim 1, wherein the at least one vehicle sensor comprises a sonar sensor, an optical sensor, a radar sensor, or some combination thereof.

6. The system as in claim 1, wherein the at least one light strip comprises an LED or flex Neon light strip.

7. The system as in claim 1, wherein the optical indication comprises green light to indicate that the vehicle should be moved forward, blue light to indicate that the vehicle should be moved backward, and red light to indicate that the vehicle should be stopped.

8. The system as in claim 7, wherein the optical indication further comprises apparent movement of the green light forward, apparent movement of the blue light backward, and no movement of the red light.

9. The system as in claim 1, wherein the steps further comprise generating an optical indication using the at least one light strip of a malfunction.

10. A method of assisting a driver with properly positioning a vehicle performed using at least one computing device including at one or more tangible computing elements, comprising:
    determining, by the at least one computing device, a position of the vehicle using information from at least one vehicle sensor; and
    generating, under control of the at least one computing device, at least one optical indication using at least one light strip disposed on or in a floor of a carwash bay of an action that the driver should take based on the position of the vehicle;
    wherein the at least one light strip is disposed in a groove of a material placed on the floor of the carwash bay; or
    wherein the at least one light strip is disposed in a groove in the floor of the carwash bay.

11. The method as in claim 10, wherein the method is deployed in a carwash bay and assists the driver with properly positioning the vehicle in the carwash bay.

12. The method as in claim 10, wherein the at least one light strip is disposed in the groove of the material placed on the floor of the carwash bay.

13. The method as in claim 10, wherein the at least one light strip is disposed in the groove in the floor of the carwash bay.

14. The method as in claim 10, wherein the at least one vehicle sensor comprises a sonar sensor, an optical sensor, a radar sensor, or some combination thereof.

15. The method as in claim 10, wherein the at least one light strip comprises an LED or flex Neon light strip.

16. The method as in claim 10, wherein the optical indication comprises green light to indicate that the vehicle should be moved forward, blue light to indicate that the vehicle should be moved backward, and red light to indicate that the vehicle should be stopped.

17. The method as in claim 16, wherein the optical indication further comprises apparent movement of the green light forward, apparent movement of the blue light backward, and no movement of the red light.

18. The method as in claim 1, further comprising generating an optical indication using the at least one light strip of a malfunction.

\* \* \* \* \*